United States Patent
Meijer et al.

(10) Patent No.: US 7,650,573 B2
(45) Date of Patent: Jan. 19, 2010

(54) LAYOUT RULES FOR WHITESPACE SENSITIVE LITERALS

(75) Inventors: Henricus Johannes Maria Meijer, Mercer Island, WA (US); Brian C. Beckman, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 652 days.

(21) Appl. No.: 11/201,779

(22) Filed: Aug. 11, 2005

(65) Prior Publication Data

US 2007/0035421 A1    Feb. 15, 2007

(51) Int. Cl.
G06F 17/00    (2006.01)

(52) U.S. Cl. .................. 715/762; 715/764; 715/209; 715/710; 715/716

(58) Field of Classification Search .................. 715/225, 715/212, 243–247, 762, 764; 700/171; 345/660; 364/148

See application file for complete search history.

(56) References Cited

U.S. PATENT DOCUMENTS

| | | | |
|---|---|---|---|
| 5,752,058 A | 5/1998 | Van De Vanter | |
| 5,857,212 A * | 1/1999 | Van De Vanter | ............ 715/234 |
| 6,182,029 B1 | 1/2001 | Friedman | |
| 6,799,718 B2 | 10/2004 | Chan et al. | |
| 2003/0066058 A1 * | 4/2003 | Van De Vanter | ............ 717/143 |
| 2003/0229607 A1 | 12/2003 | Zellweger et al. | |
| 2006/0026504 A1 * | 2/2006 | Balinsky | ..................... 715/513 |

FOREIGN PATENT DOCUMENTS

WO    WO0111492    2/2001

OTHER PUBLICATIONS

Dave Pawson, ("XSL-FO" Published by O'Reilly 2002, US) pp. 1-61.*
Altova- "XMLSpy Manual" Version 4.4—published 1998-2001 pertinent pp. 1-605.*
Borland, Borland CodeWright 7.5 Feature Matrix. 1991-2003 Starbase Corporation. 7 pages.
Simon Peyton Jones, et al. Report on the Programming Language—Haskell 98: A Non-strict, Purely Functional Language. Feb. 1, 1999.
Martijn Michiel Schrage. Proxima: A presentation-oriented editor for structured documents. Jun. 4, 1973.

* cited by examiner

*Primary Examiner*—Doug Hutton
*Assistant Examiner*—Quoc A Tran
(74) *Attorney, Agent, or Firm*—Workman Nydegger

(57) ABSTRACT

Layout rules are provided that enable white-space sensitive literals to be developed within a source program according to arbitrarily defined or virtual margins. In one aspect, a computerized programming system is provided. The system includes a source program having one or more computer program codes or instructions. A rules component enables a virtual margin to be positioned within the source program, where the virtual margin can be offset from a default margin by at least one position in the source program. The rules component enables a plurality of virtual margins to be nested within the source program. This includes allowing deviations in the margin such as a hole to be declared in the virtual margin.

18 Claims, 13 Drawing Sheets

```
Class C
  Function M() As String
    Dim S As String
    If True Then
      S = <Person>
<Name>John Doe</Name>
</Person>.ToString()
    Else
      S = <<EOS
A long string
EOS
    End If
    Return S
  End Function
End Class
```

FIG. 2

```
Class C
    Function M() As String
        Dim X As XML
        X = <Person>
              <Name>John Doe</Name>
            </Person>
        Return X
    End Function
End Class
```
410

```
Class C
    Function M() As String
        Dim X As XML
        X = _
            <Person>
              <Name>John Doe</Name>
            </Person>
        Return X
    End Function
End Class
```
400

FIG. 4

```
Class C
    Function M() As String
        Dim X As XML
        X = <Person>
            <Name>John Doe</Name>
            </Person>
        Return X
    End Function
End Class
```

FIG. 5

```
Class C
    Function M() As String
        Dim X As XML
        X = <Person>
              <Name><%= _            ← 610
                    Console.ReadLine() %></Name>
            </Person>
        Return X
    End Function
End Class
```

── 600

```
Class C
    Function M() As XML                ← 620
        Dim X As XML
        X = <Person>
              <Name>                   ← 630
                <%
                   Dim FirstName, LastName As String
                   FirstName = Console.ReadLine()
                   Return FirstName
                   LastName = Console.ReadLine()
                   Return LastName
                %>
              </Name>
            </Person>
        Return X
    End Function
End Class
```

FIG. 6

```
Class C
    Function M() As String
        Dim X As XML
        X = <Person>
              <Name>
                <%
                    Return <FirstName>
                              <%= Console.ReadLine() %>
                           </FirstName>
                %>
              </Name>
            </Person>
        Return <LastName><%= Console.ReadLine() %></LastName>
        %>
        Return X
    End Function
End Class
```

FIG. 7

```
Dim X As String = <![CDATA[This is a short
                  multi-line string]]>
```
⬆ 900

```
Dim X As String = <>This is a long
                  multi-line string
                  with.<%= Console.ReadLine() %>.embedded
                  expressions</>
```
⬆ 910    ⬆ 920

FIG. 9

LAYOUT RULES FOR WHITESPACE SENSITIVE LITERALS

BACKGROUND

Structured and logical programming or coding techniques serve many purposes in the life cycle of a given software design. Such designs are generally implemented with a plurality of different programming languages where the cycle begins within the framework of some type of source code development program or environment. Well-written programs that are designed properly help to serve the various needs of the software life cycle. These needs or goals generally include code design, debug, testing, deployment, and maintenance. The design phase is often the most crucial since it will generally have an impact on all the phases that follow. Thus, to support these goals, code should be logically written and in a format that is easily readable in order to facilitate future debug, testing and so forth. This type of coding generally includes a structure where instructions are indented in the source code to indicate transitions from one type of instruction to another such as to indicate that an inner loop is about to occur within the boundaries of some other instruction such as an outer loop. Another feature of well-written programs is via the liberal employment of comments to indicate the design purpose of any given sequence of code.

Along with actual instructions in a source code program, other type of strings or literals may appear. One example of these types of literals are referred to as a here-documents (or here-doc). A here-document refers to a way of embedding one document, formatted in one way into another enclosing document, often formatted in a different way, where the two document formats would clash. The term may have originated with BourneShell, which uses two left-angle-brackets followed by a sequence of characters, followed by the content, followed by a line containing nothing but the sequence of characters, i.e., as in the following example:

```
Usage( )
echo <<FOOBARHELP
This program rearranges the foobars installed on computer
system. To use, invoke with the following options: <opt 1 opt 2>
FOOBARHELP
```

Many other programming languages—most notably scripting languages and markup formats, employ here documents. For instance, PerlLanguage uses a syntax similar to BourneShell. PythonLanguage uses three double quotes to begin and end here documents, whereas ExtensibleMarkupLanguage (XML) uses CDATA sections. Here-documents also provide a popular way of creating multi-line strings. The beginning of the string introduces a marker, in the following example EOS. All the text from the next line after the start tag to the occurrence of the marker is taken as a verbatim string:

```
                    example = <<EOS
                    Verbatim string
                    Using classic
                    here-doc syntax
                    EOS
```

In one example, the C# language offers a simple form of heredoc string using @" as the fixed start tag and "as the fixed end tag. Verbatim strings require embedded quotes to be escaped as "" (two quotes). One of the main problems with here-doc literals is that everything from just after the start marker to just before the end marker is part of the resulting string. This is inconvenient if one needed to create a string nested inside a program since the here-doc breaks the indentation flow of the program as in the following example (the string content is bold):

```
Class C
       Function M( ) As String
              Dim S As String
              If True Then
                     S = <<EOS
A
long
string
EOS
              Else
                     S = <<EOS
Another
long string
EOS
              End If
       End Function
End Class
```

A similar problem occurs with other literals where white space is relevant, for example XML literals. Again, the following example shows how the normal indentation flow of the program is disrupted:

```
Class C
       Function M( ) As String
              Dim S As String
              If True Then
                     S = <Person>
       <Name>John Doe</Name>
</Person>
              Else
                     S = _
<Person>
       <Name>Jane Doe</Name>
</Person>
              End If
       End Function
End Class
```

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Various layout rules are provided for white-space sensitive literals to facilitate orderly and efficient programming techniques that support easy-to-read and maintainable software designs. Virtual margin capabilities are provided in the context of substantially any programming environment that enhance traditional left-margin defaults for the declarations of literals where white space within the traditional literal space would conventionally be considered as part of the literal. In general, the way source code is conventionally written requires that when a string or literal is defined that whatever follows—including non-printable control characters such as spaces and tabs form part of the declared string. This requires that longer strings that may run over to the next line of source code would continue up and until the end of the given literal was determined. This causes code to appear choppy and disjointed from the normal sequence of readable indentations or character positions.

The layout rules provided herein enable a virtual margin (or margins) to be established when a literal is declared that allows the literal to be positioned from the normal default of the left source code margin and that any space appearing to the left of the virtual margin would also not impact upon the declaration of the given literal. In this manner, literals can be declared employing normal or desired indentations for the literals with respect to the default margins. This causes the literals to appear in the desired position and confines of the source code which facilitates a much more readable and manageable form for structured program development. Virtual margins can be established via the rules in nested forms where a plurality of margins may be declared allowing many literals to be declared that are indented at differing positions or distances from the default left margin. Also, sequences can be declared that allow holes or gaps to appear in the virtual margins as circumstances may dictate.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 2 illustrates an exemplary code fragment having virtual margins for literals.

FIG. 4 illustrates an XML code example for virtual margins.

FIG. 5 illustrates an XML code example having a margin error.

FIG. 6 illustrates examples of embedded code being defined to the left of a virtual margin.

FIG. 7 illustrates code examples of virtual nested margins.

FIG. 9 illustrates alternative example XML fragments.

DETAILED DESCRIPTION

Layout rules are provided that enable white-space sensitive literals to be developed within a source program according to arbitrarily defined or virtual margins. Such margins enable literals such as strings to be indented or positioned within a program according to the normal flow of a program and without bleeding into the left most portions of code that disrupt the smooth and readable flow of the program. In one aspect, a computerized programming system is provided. The system includes a source program having one or more computer program codes or instructions. A rules component enables a virtual margin to be positioned within the source program, where the virtual margin can be offset from a default margin by at least one position in the source program. The rules component enables a plurality of virtual margins to be nested within the source program. This includes allowing deviations in the margin such as a hole to be declared in the virtual margin. The hole defines a location in the virtual margin where instructions or data can be inserted to the left of the virtual margin. Also, the rules component can enable generation of an error for data inputs or codes that appear to the left of the virtual margin.

As used in this application, the terms "component," "margin," "file," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
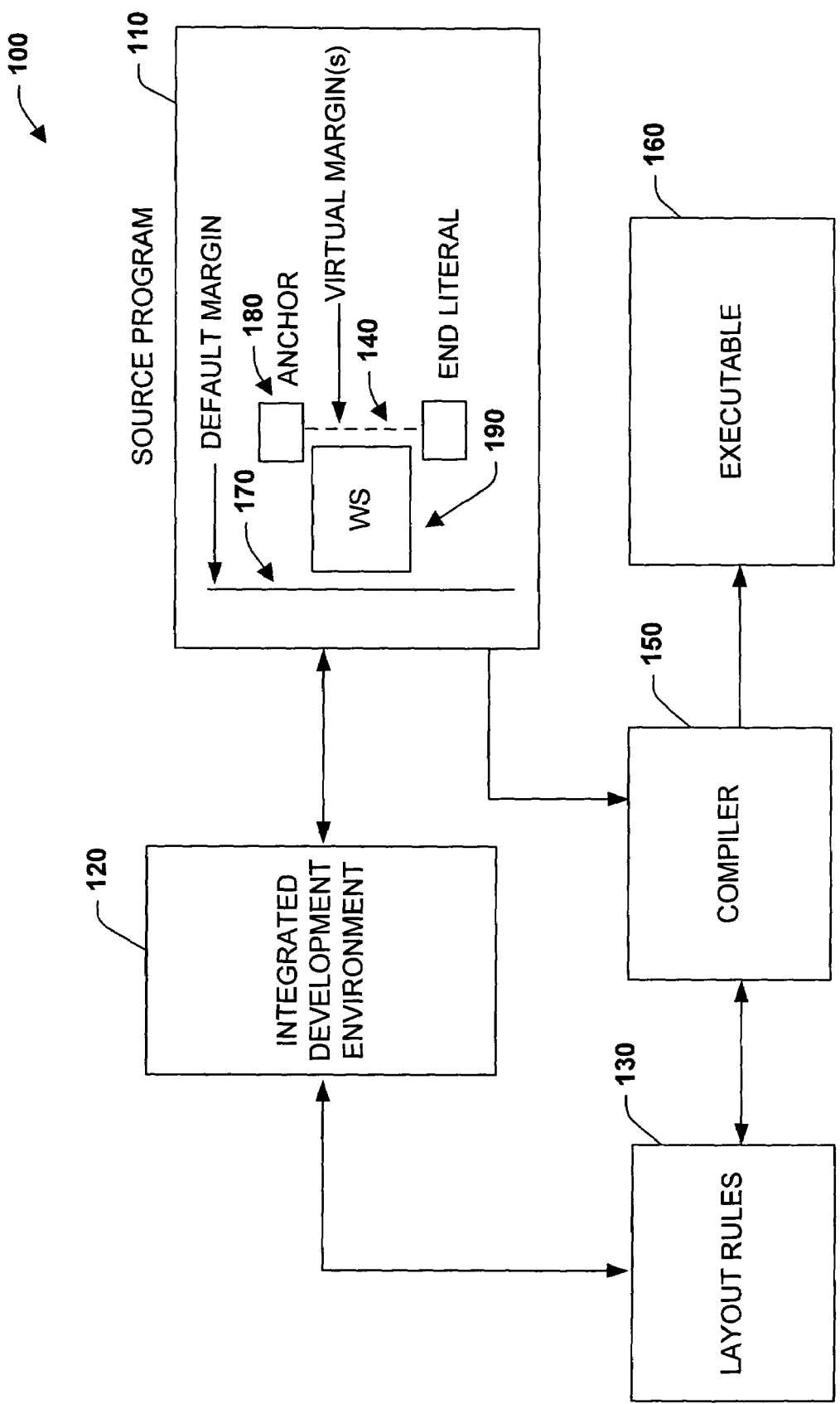
FIG. 1 is a schematic block diagram illustrating a programming environment for white-space sensitive literals.

Referring initially to FIG. 1, a programming environment 100 for white-space sensitive literals is illustrated. The system 100 includes a source program 110 that is developed, designed, or edited by an Integrated Development Environment 120 (IDE). The IDE 120 can be associated with a more elaborate programming station such as a developer studio application for example, or associated with a more basic tool such as a code text editor, for example. In general, one or more layout rules 130 are provided to allow one or more virtual margins 140 to be declared within the source program 110. A compiler 150 processes the source program according to well-known compilation techniques and in view of the layout rules 130 to produce executable code for a computer at 160.

The layout rules 130 provide a framework for enabling developers to enter literals within the source program 110 in a manner that is not constrained by conventional development guidelines. For instance, a default margin is illustrated at 170 within the source program. Normally, all declared code would be referenced from this default margin 170. Thus, if a string were to be declared that was indented or positioned from this margin 170 by white space or tabs, and the string were to run into the next line of code, the run-over into the next line would disrupt the flow and previous code indentations in the source program 110 by starting over at the default margin 170. As illustrated, when a literal is declared at 180, an anchor point is established that begins the definition of the virtual margin 140. White space (WS) 190 to the left of the virtual margin 140 is not considered part of the literal and is allowed to exist in the source program 110 to show the boundary point for the literal definition. As will be described in more detail below, nested virtual boundaries are possible along with possible disruptions in the boundaries as defined by particular codes in the source program 110.

It is noted that substantially any code or sequence can be employed to indicate the anchor 180 or start of the virtual margin 140 for a literal declaration. Likewise, the end of the virtual margin 140 can be defined by substantially any code or sequence. In general, the layout rules 130 are provided for literals for which white space is considered relevant. In other words, in a convention system, if spaces were added to enhance code readability, the white space would merely be considered part of the literal definition.

In the following example illustrated in FIG. 2, XML and string literals are formed from all text to the right of a left margin 200 and determined by the first token of the XML literal and the first token of a start tag of a here-doc, respectively. As illustrated, two strings are defined at 210 and 220 respectively having a virtual margin formed at 230. Spaces 240 and 250 to the right of the virtual margin are not considered part of the strings 210 and 220, respectively. It is generally considered an error for non-white space to appear to the left of the virtual margin 230 determined by the start token of the construct. All white space to the right of the virtual margin 230 is considered part of the literal as defined by the layout rules described above.

Referring back to FIG. 1, the layout rules 130 are generally provided as part of a text- and program-authoring toolset such as the Integrated Development Environment, or IDE 120. Such environments typically coordinate syntax rules for multiple languages, helping users to write C# code, Visual Basic, along with a plurality of other different languages as can be appreciated. These tools can provide context-sensitive coloring, hinting (e.g., Intellisense), and indentation. Indentation typically employs space characters (ASCII hex 20) and tab characters (ASCII hex 9), for example although other non-alphanumeric ASCII codes are possible. The IDE 120 generally offers the user an opportunity to configure (select) an equivalence between one tab character and a maximal number of space characters, usually 4 or 8 space characters, for example. This implies that the IDE 120 can display tab characters input from the keyboard as a number of space characters between 1 and the configured maximal number. Another option offered to the user is whether to store tab characters, or to convert them to spaces in durable files. The latter option is usually preferred when it is possible that some other person will be reading the files, and that other person may have configured a different tab-space equivalence.

Generally, the components of the system 100 such as the IDE 120 and the compiler 150 will have some knowledge of the tab-space equivalence and whether to store tab characters. Thus, the layout rules 130 interact with the IDE 120 to determine this type information. The layout rules 130 can provide various functionalities for source code development such as placement of artificial or virtual left-margins determined by start of construct identifiers. These can also allow resetting virtual left margins when escaping back to code sequence from the literal declarations. As will be described in more detail below, other functionality includes nesting of left margins, using XML literals as in place of here-docs, IDE support for editing nested blocks, and the significance of white space when parsing (XML) literals.

It is also noted that the IDE 120 can be provided as part of a graphical interface application for administering the layout rules described herein. This can include substantially any type of user interface for editing, executing, testing or debugging source code. The user interfaces can be provided as a Graphical User Interface (GUI) or other type. For example, the interfaces can include one or more display objects (e.g., icon) that can include such aspects as configurable icons, buttons, sliders, input boxes, selection options, menus, tabs and so forth having multiple configurable dimensions, shapes, colors, text, data and sounds to facilitate operations with the systems and data described herein. In addition, user inputs can be provided that include a plurality of other inputs or controls for adjusting and configuring one or more aspects described herein. This can include receiving user commands from a mouse, keyboard, speech input, web site, browser, remote web service and/or other device such as a microphone, camera or video input to affect or modify operations of the various components described herein.

Figure 3:
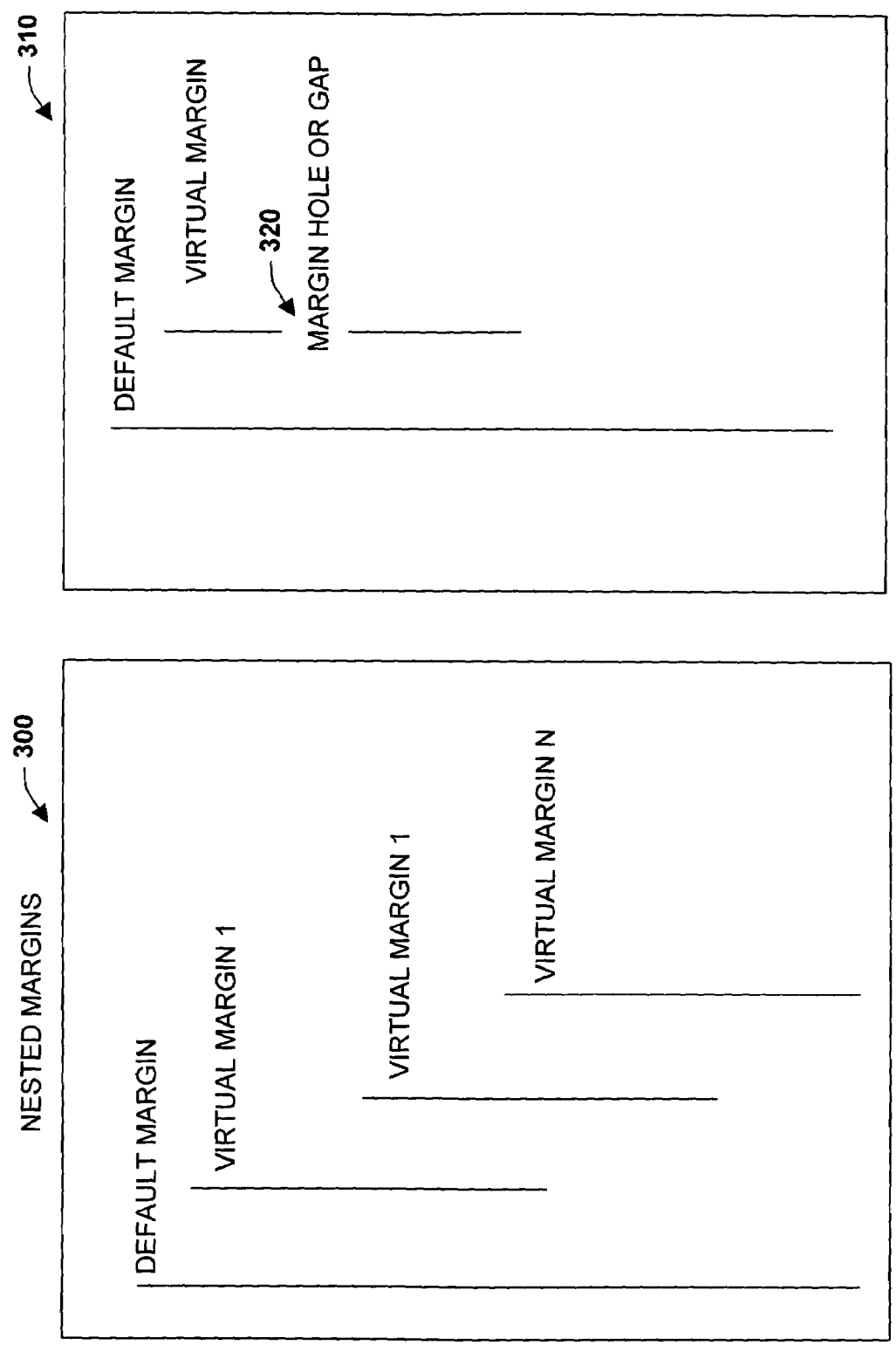
FIG. 3 illustrates virtual margin examples.

Referring to FIG. 3, some example virtual margin applications are illustrated. At 300 a nesting margin example is shown. In this example, a default margin is shown to the far left of the example 300. Proceeding to the right of the default margin, one or more nested margins may be declared where each respective string as indicated by some starting code begins a new margin. Thus, a first literal may be declared to the right of the default margin having a virtual margin beginning at the definition of the first literal. Some time later, a second literal may be declared underneath the first literal and having a virtual margin declared to the right of the default margin and to the right of the first virtual margin. As can be appreciated this pattern can continue with other virtual margins declared to the right or previously declared margins.

At 310, a second margin example is provided. In this example, a margin hole or gap 320 is depicted in a virtual margin. In this case, a code sequence may identify a portion or gap in the virtual margin where it may be allowable to enter some other type of code than white space to the left of the virtual margin without generating an error. Thus, the code sequence may indicate a break in the definition of the literal to allow some other code or instruction to be entered before resuming with the definition of the literal and resumption of the virtual margin associated with the literal. As can be appreciated, more than one gap can be defined within a virtual margin. Specific code examples will now be provided below to illustrate some of the concepts described herein.

Turning to FIG. 4, two specific code examples illustrate virtual margins and white space rules. White space is an important part of various types of literal text, in particular, of strings and XML documents. This layout rules described herein provide for nesting literals in source code. Thus, even though many of the literals in the following examples employ XML, substantially any form of literals are applicable with the rules described herein where white space is significant as part of the definition of the literal. At 400, the first < token of an XML literal establishes a virtual left margin for the rest of the XML literal. Thus, all white space to the left of this margin 400 or forbidden zone (for most cases), is ignored, whereas all characters to the right of this margin are part of the literal definition. As illustrated at 410, without the layout rules and virtual margin, the literal definition falls in line with the default margin provided by the source code tool. As shown, when the literal merely falls in line with the left most margin at 410, the source code is more difficult to read, test, debug, and maintain since the normal indented flow of the code is disrupted when the literal automatically migrates to the default left margin.

Referring briefly to FIG. 5, an alternative XML example 500 is illustrated where an error code is generated due to a virtual margin violation. In this example, a virtual margin 510 is established by declaration of a <Person> literal. Note however that a <Name> which is part of the literal definition has been declared at 520 to the left of the virtual margin 510. It is considered a syntactic error for non-white space characters to occur to the left of the margin 510, assuming that negative white space does not exist. Thus, the IDE could alert the user during entry of this type of margin violation or a compiler can generate an error upon encountering such violation.

FIG. 6 illustrates examples of embedded code existing to the left of a virtual margin. In these example, XML literals (or other type literals) can contain embedded code, in which case the virtual left margin is temporarily interrupted and restored at the end of the embedded code, the following two examples show an embedded expression and embedded statement list. At 600, a virtual margin exists beginning at the <Person>. At 620 a special code sequence such as < %=in this example, identifies the following code is an embedded sequence of codes. As shown, such embedded sequence can exist to the left of the virtual margin 600 without causing an error. In this example, a console.readline( ) is embedded. At 620 a virtual margin is defined beginning with a <Person> declaration. In this example, a <%=code at 630 signifies the beginning of an embedded statement list. The following example statements thus are allowed to exist to the left of the virtual margin 620 by virtue of special codes that indicate a break in the literal definition:

```
Dim FirstName, LastName As String
FirstName = Console.ReadLine( )
Return FirstName
LastName = Console.ReadLine( )
Return LastName
```

In both examples, the end of the embedded code is signaled by a %> sequence. It is to be appreciated that other code sequence can be employed to signify embedded code sequences than the examples illustrated herein.

FIG. 7 illustrates a code example showing virtual nested margins. In this example, two virtual margins are shown at 700 and 710, where the virtual margin at 710 is nested or placed within the boundaries of the virtual margin 700. Thus, program-code expressions and statements embedded inside XML literals themselves can contain XML literals. This recursively establishes a new virtual left margin, independent of any enclosing virtual left margins that may have been previously declared. It is noted that one implementation of the layout rule (or rules) above can utilize a scanner and parser to maintain a stack of active left-margins. Thus, the currently active left margin can be enforced while in "XML" mode and temporarily not enforced when switching back from "XML" mode to "normal" mode. A new margin can be established when switching from "normal" mode to "XML" mode, and reset upon switching back from "XML" to "normal" mode, as desired.

Figure 8:
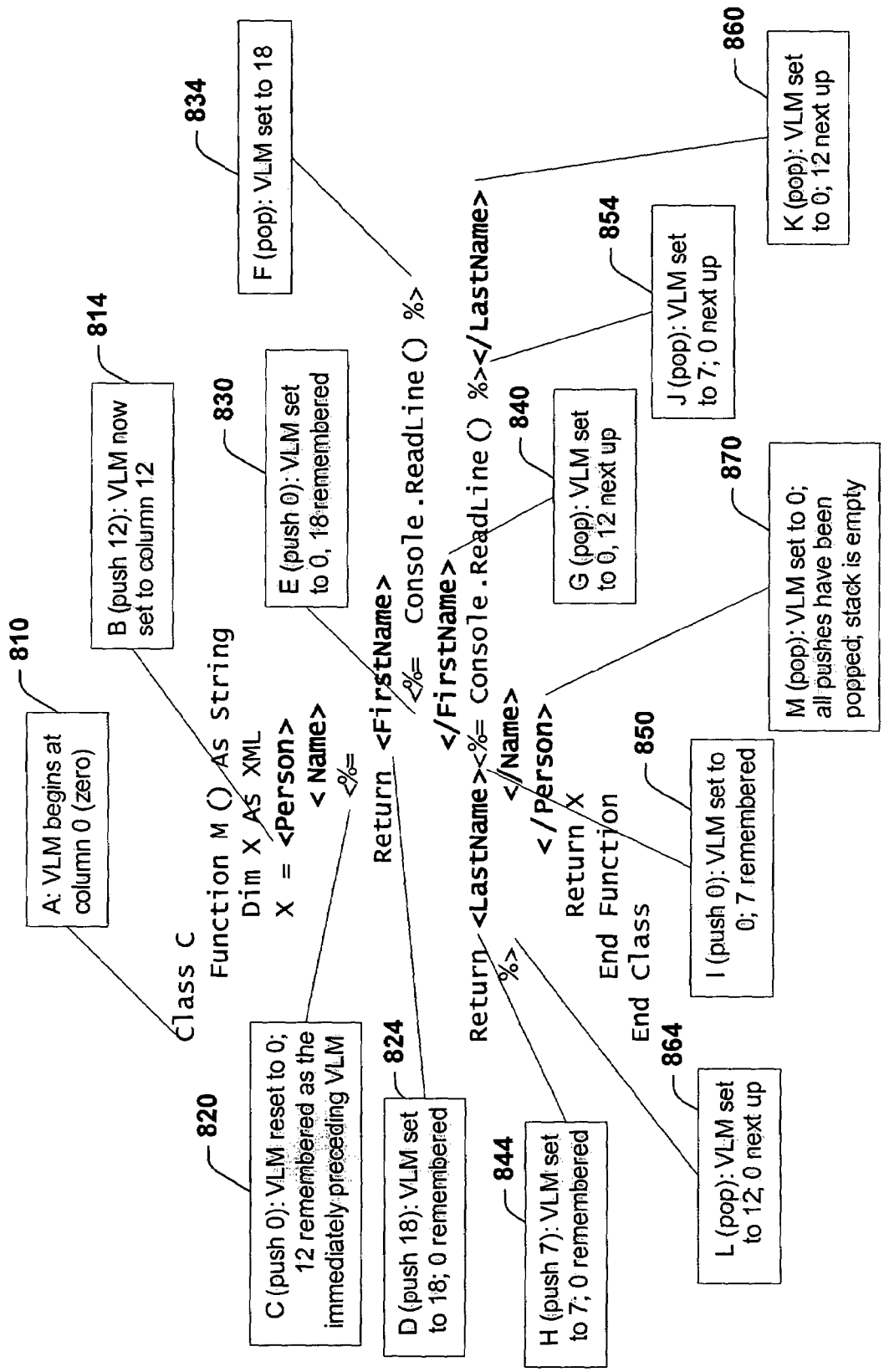
FIG. 8 illustrates example stack operations for virtual margins.

Referring to FIG. 8, a code example provides various example state, stack and margin examples. As a scanner and parser traverses the code text example in FIG. 8, it encounters the following sequence of example events, with lettered labels A-M consistent with the figure. VLM is an acronym for virtual left margin. At 810, A: start state, Stack is [ ], containing nothing, implying VLM=0. At 814, B: "<" in context implies push 12<Person>. Stack is [12<Person>]. VLM is now 12. At 820, C: "<%=" in context implies push 0. Stack is now [0,12<Person>]. VLM is now 0. At 824, D: "<" in context implies push 18<FirstName>. Stack is now [18<FirstName>, 0,12<Person>]. VLM is now 18. At 830, E: "<%=" in context implies push 0. Stack is now [0,18<FirstName>,0,12<Person>]. VLM is now 0. At 834, F: "%>" in context implies pop. Stack is now [18<FirstName>,0,12<Person>]. VLM is now 18. At 840, G: "</FirstName>" in context matches stack and causes pop. Stack is [0,12<Person>]. VLM is now 0. At 844, H: "<" in context causes push 7<LastName>. Stack is [7<LastName>,0,12<Person>]. VLM is 7. At 850, I: "<%=" in context causes push 0. Stack is [0,7<LastName>,0,12<Person>]. VLM is 0. At 854, J: "%>" causes pop. Stack is [7<LastName>,0,12<Person>]. VLM is 7. At 860, K: "</LastName>" matches stack and causes pop. Stack is [0,12<Person>]. VLM is 0. At 864, L: "%>" causes pop, stack is [12<Person>]. VLM is 12. At 870, M: "</Person> causes pop. Stack is [ ], empty. VLM is 0. The following table summarizes the stack operations described in this example:

TABLE 1

| Step | Input | Stack op | Stack Contents | VLM |
|---|---|---|---|---|
| A | | Start | [] | 0 |
| B | <Person> | push | [12<Person>] | 12 |
| C | <%= | push | [0,12<Person>] | 0 |
| D | <FirstName> | push | [18<FirstName>,0,12<Person>] | 18 |
| E | <%= | push | [0,18<FirstName>,0,12<Person>] | 0 |
| F | %> | pop | [18<FirstName>,0,12<Person>] | 18 |
| G | </FirstName> | pop | [0,12<Person>] | 0 |
| H | <LastName> | push | [7<LastName>,0,12<Person>] | 7 |
| I | <%= | push | [0,7<LastName>,0,12<Person>] | 0 |
| J | %> | pop | [7<LastName>,0,12<Person>] | 7 |
| K | </LastName> | pop | [0,12<Person>] | 0 |
| L | %> | pop | [12<Person>] | 12 |
| M | </Person> | pop | [] | 0 |

Note the following rules that can be applied. If VLM is non-zero, the stack may not be empty. If VLM is non-zero, then generally only a "< %=" may cause a push. If VLM is zero, only a "<start-tag>" may cause a push, and the "start-tag" should be remembered along with the current column. If VLM is zero, generally only "%>" may cause a pop. If VLM is non-zero, generally only a "</start-tag>" may cause a pop, and "start-tag" should match that on top of the stack. It is a syntax error if a non-white space token appears to the left of the currently active left-margin. Also, the IDE can enforce the left margin by not allowing the cursor to be positioned to in the "forbidden" zone to the left of the virtual margin. The IDE may visually indicate the currently active area similar to the use of coloring over a subset of selected text, but not limited to coloring, but for instance using a bounding "box" as an example.

FIG. 9 illustrates alternative XML examples. At 900, XML literals can be employed similarly to here-doc expressions described above. Thus, XML CDATA can be utilized similarly to here-doc expressions to indicate virtual margins. At 910, another approach is to use XML fragments, which allows embedded expressions within the fragments as illustrated at 920.

Figure 10:
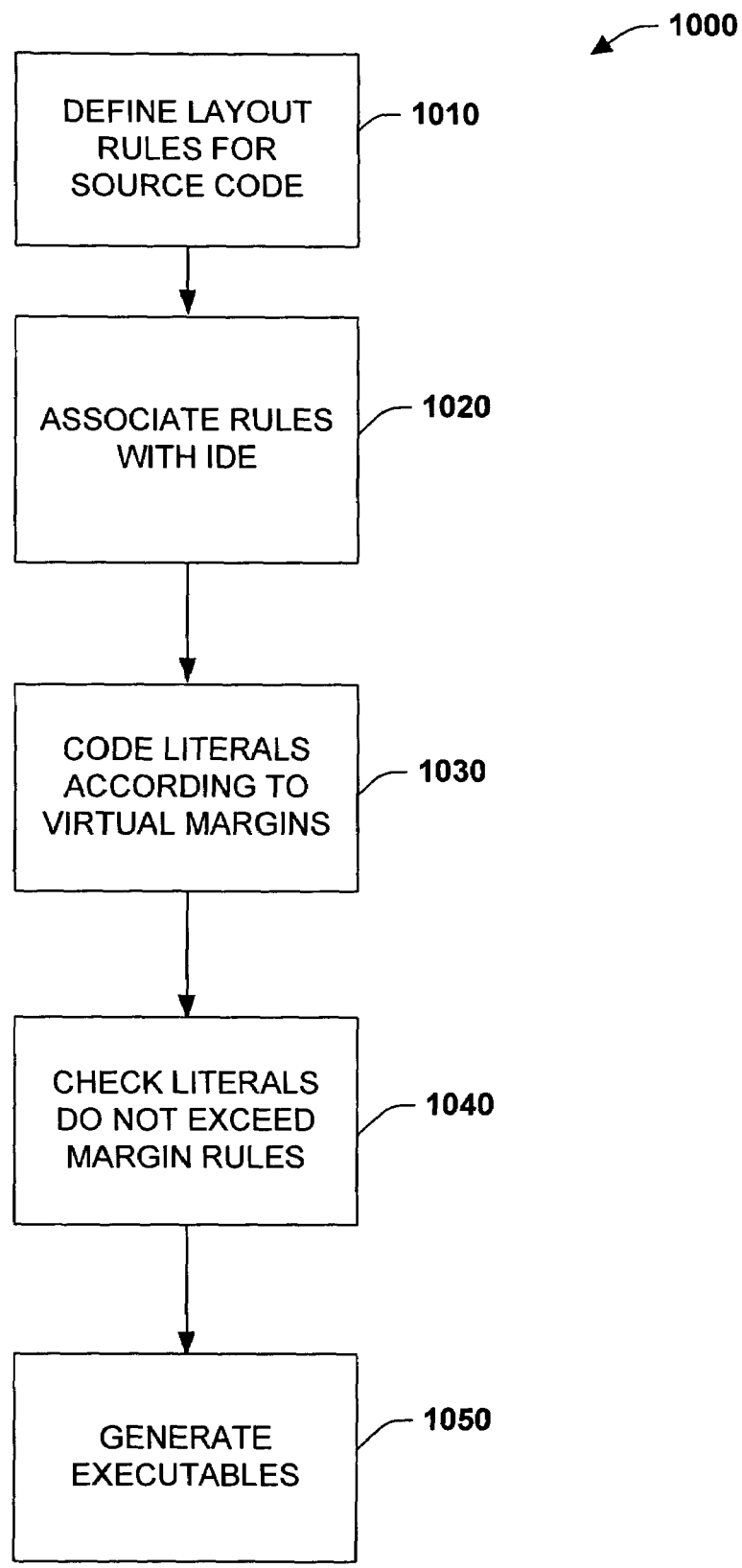
FIG. 10 is a flow diagram illustrating an example process for layout rules and virtual margin processing.

FIG. 10 illustrates various process aspects of layout rules for virtual margins. While, for purposes of simplicity of explanation, the process 1000 is shown and described as a series or number of acts, it is to be understood and appreciated that the subject process is not limited by the order of acts, as some acts may, in accordance with the subject process, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject process.

Proceeding to 1010, one or more layout rules are defined for processing white space and literal definitions. Such rules allow the literals to be defined from a virtual margin in a source code file that is different or to the left of conventional default margins. This includes enabling virtual nested margins and/or allowing code to be embedded that might disrupt the margin. As noted above, special codes can indicate that the following codes from the special sequence are to be allowed to cross virtual margin restrictions. At 1020, the layout rules are associated with a development tool such as an Integrated Development Environment (IDE). At 1030, literals are coded within a source program according to virtual margins that can be arbitrarily established according to a beginning code and ending sequence for the literal. This can include here-doc type expressions, XML expressions, or substantially any type of expression that can be employed to indicate the beginning or end of a literal sequence. Such codes then are employed to establish virtual margins that may exist within the confines of the source code. At 1040, various checks can be performed to enforce the above described rules. This can include IDE checks that would prevent literal expressions from exceeding the bounds of a given virtual margin and/or can include compiler checks that would generate error codes depending if a detected margin were violated by a literal definition or non-embedded code exception. At 1050, a compiler adapted to compile the layout rules described herein generates one or more source files that can subsequently executed on a computer.

Figure 11:
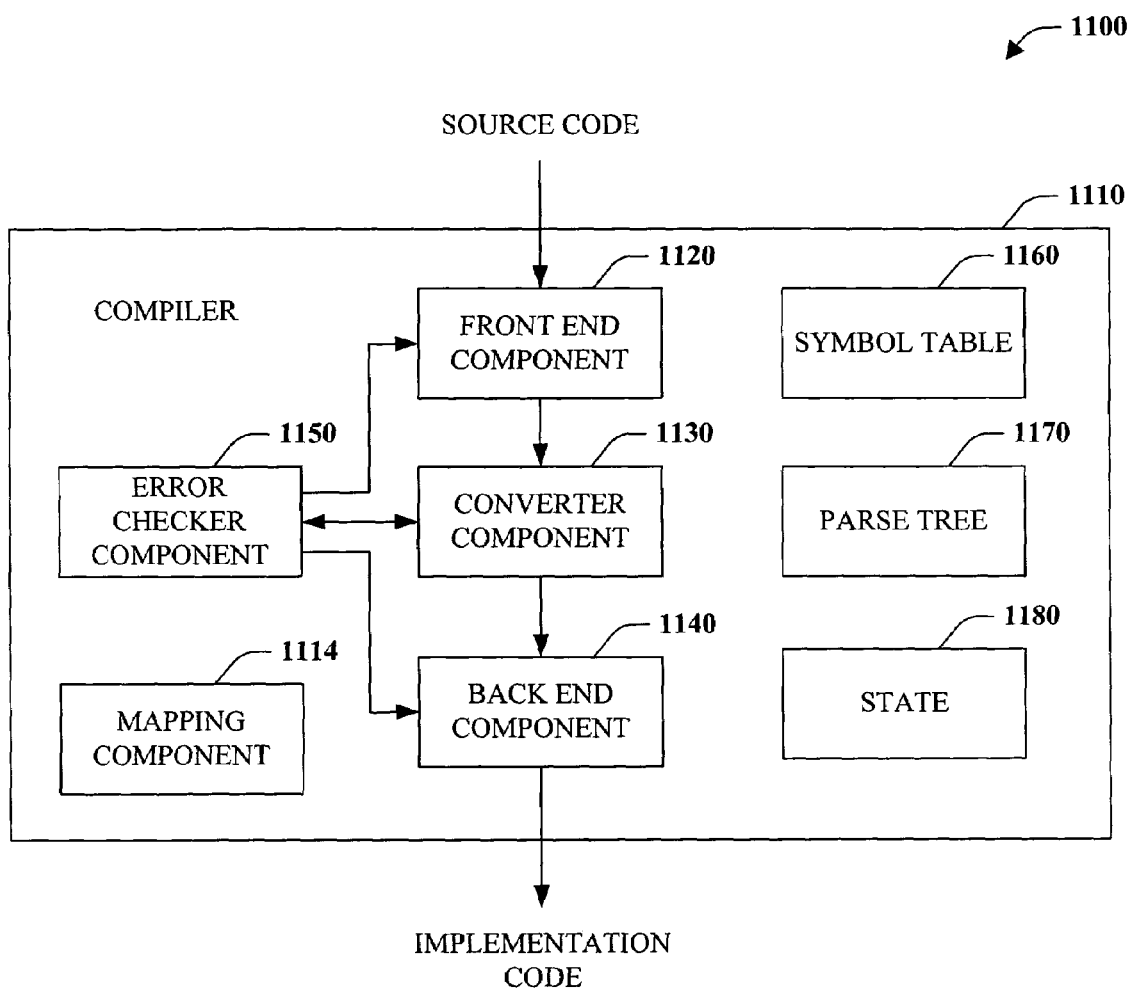
FIG. 11 is a schematic block diagram of an example compiler operating environment.

FIG. 11 is a block diagram depicting a compiler environment 1100 that can be utilized to produce implementation code (e.g., executable, intermediate language . . . ). The compiler environment 1100 includes a compiler 1110 including a mapping component 1114 as described above, a front-end component 1120, a converter component 1130, a back-end component 1140, an error checker component 1150, a symbol table 1160, a parse tree 1170, and state 1180. The compiler 1110 accepts source code as input and produces implementation code as output. The input can include but is not limited to delimited programmatic expressions or qualified identifier as described herein. The relationships amongst the components and modules of the compiler environment illustrate the main flow of data. Other components and relationships are not illustrated for the sake of clarity and simplicity. Depending on implementation, components can be added, omitted, split into multiple modules, combined with other modules, and/or other configurations of modules.

The compiler 1120 can accept as input a file having source code associated with processing of a sequence of elements. The source code may include various expressions and associated functions, methods and/or other programmatic constructs. The compiler 1120 may process source code in conjunction with one or more components for analyzing constructs and generating or injecting code.

A front-end component 1120 reads and performs lexical analysis upon the source code. In essence, the front-end component 1120 reads and translates a sequence of characters (e.g., alphanumeric) in the source code into syntactic elements or tokens, indicating constants, identifiers, operator symbols, keywords, and punctuation among other things.

The converter component 1130 parses the tokens into an intermediate representation. For instance, the converter component 1130 can check syntax and group tokens into expressions or other syntactic structures, which in turn coalesce into statement trees. Conceptually, these trees form a parse tree 1170. Furthermore and as appropriate, the converter module 1130 can place entries into a symbol table 1130 that lists symbol names and type information used in the source code along with related characteristics.

A state 1180 can be employed to track the progress of the compiler 1110 in processing the received or retrieved source code and forming the parse tree 1170. For example, different state values indicate that the compiler 1110 is at the start of a class definition or functions, has just declared a class member, or has completed an expression. As the compiler progresses, it continually updates the state 1180. The compiler 1110 may partially or fully expose the state 1180 to an outside entity, which can then provide input to the compiler 1110.

Based upon constructs or other signals in the source code (or if the opportunity is otherwise recognized), the converter component 1130 or another component can inject code corresponding to facilitate efficient and proper execution. Rules coded into the converter component 1130 or other component indicates what must be done to implement the desired functionality and identify locations where the code is to be injected or where other operations are to be carried out. Injected code typically includes added statements, metadata, or other elements at one or more locations, but this term can also include changing, deleting, or otherwise modifying existing source code. Injected code can be stored as one or more templates or in some other form. In addition, it should be appreciated that symbol table manipulations and parse tree transformations can take place.

Based on the symbol table 1160 and the parse tree 1170, a back-end component 1140 can translate the intermediate representation into output code. The back-end component 1140 converts the intermediate representation into instructions executable in or by a target processor, into memory allocations for variables, and so forth. The output code can be executable by a real processor, but output code that is executable by a virtual processor can also be provided.

Furthermore, the front-end component 1120 and the back end component 1140 can perform additional functions, such as code optimization, and can perform the described operations as a single phase or in multiple phases. Various other aspects of the components of compiler 1110 are conventional in nature and can be substituted with components performing equivalent functions. Additionally, at various stages during processing of the source code, an error checker component 1150 can check for errors such as errors in lexical structure, syntax errors, and even semantic errors. Upon detection error, checker component 1150 can halt compilation and generate a message indicative of the error.

Figure 12:
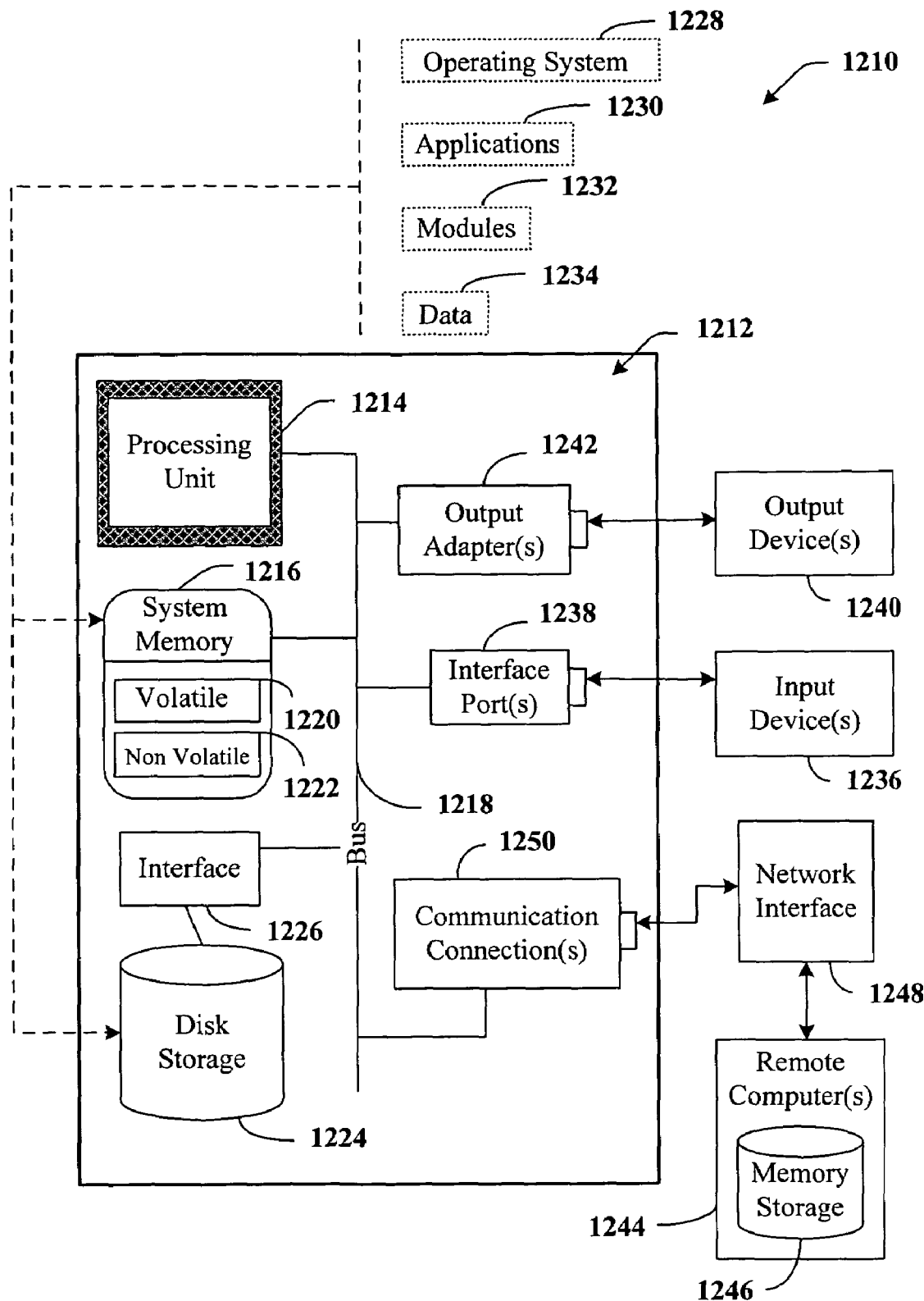
FIG. 12 is a schematic block diagram illustrating a suitable operating environment.
Figure 13:
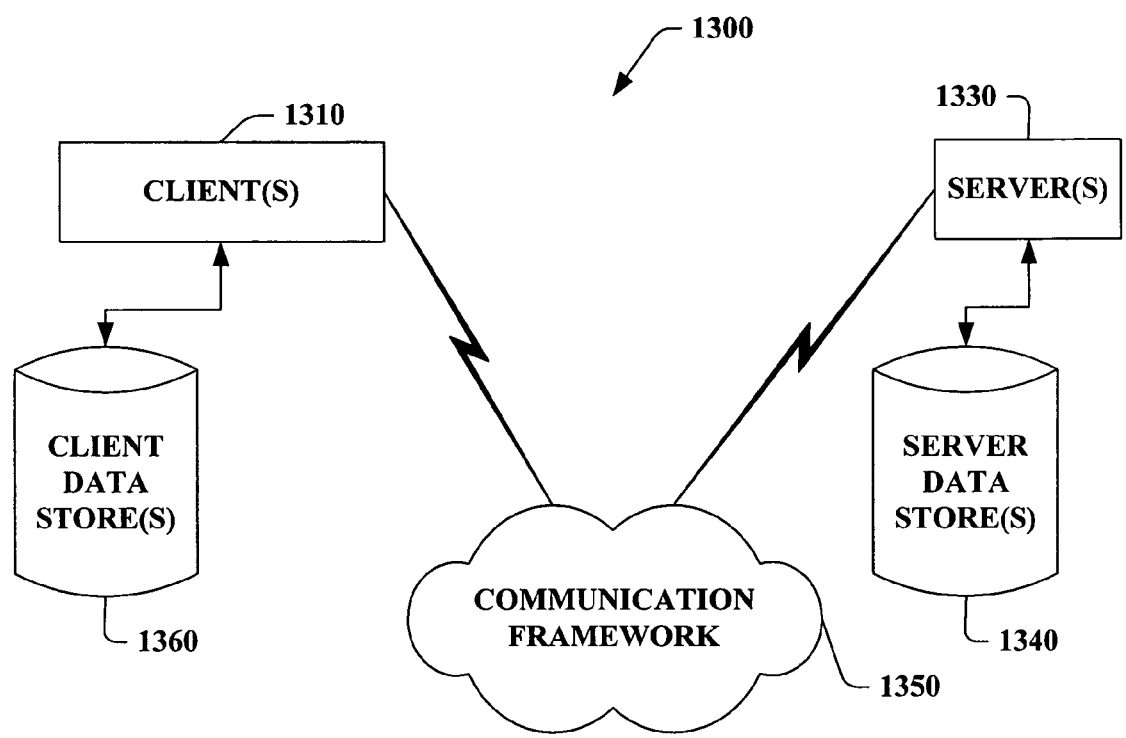
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 12, an exemplary environment 1210 for implementing various aspects described herein includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that various components described herein can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

FIG. 13 is a schematic block diagram of a sample-computing environment 1300 that can be employed. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the components described herein, for example. One possible communication between a client 1310 and a server 1330 may be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A development environment system embodied on a computer storage medium, comprising:
    an XML source program having one or more computer program codes or instructions, wherein white space is included as part of the definition of any XML literals used in the XML source program; and
    a rules component that enables at least one virtual margin to be positioned within the XML source program, the virtual margin is offset from a default margin by at least one position in the XML source program, wherein the at least one virtual margin begins when a literal is defined within the XML source program and
    wherein spaces to the left of the virtual margin are not considered part of the definition of the XML literal, the spaces to the left of the virtual margin being allowed to exist in the XML source program to show the boundary point for the definition of the literal,
    the spaces to the right of the virtual margin being considered part of the definition of the XML literal, the XML literals including at least a portion of embedded code existing to the left of the virtual margin, such that the virtual left margin is temporarily interrupted and restored at the end of the embedded code, wherein one or more special codes indicating a break in the XML literal's definition allow the embedded code to exist to the left of the virtual margin.

2. The system of claim 1, the rules component enables a plurality of virtual margins to be nested within the XML source program.

3. The system of claim 1, the rules component allows at least one hole to be declared in the virtual margin.

4. The system of claim 3, the hole defines a location in the virtual margin where instructions or data can be inserted to the left of the virtual margin.

5. The system of claim 4, the rules component establishes an error code if literals are defined to the left of a virtual margin.

6. The system of claim 1, further comprising an Integrated Development Environment (IDE) to coordinate implementation of the rules component.

7. The system of claim 6, the IDE enforces one or more rules from the rules component.

8. The system of claim 6, the IDE employs an interface output that delineates literal code and virtual margins from other code and virtual margins.

9. The system of claim 6, the IDE provides an option to a user of whether to store tab characters associated with a virtual margin or whether to convert the tab characters to spaces before storage.

10. The system of claim 1, the virtual margin is defined by a here-doc or the XML literal.

11. The system of claim 1, further comprising a compiler that is adapted to interpret the virtual margin.

12. The system of claim 11, further comprising a scanner or parser to maintain a stack of virtual left margins appearing in the XML source program.

13. The system of claim 12, further comprising a component to switch a code view between standard and XML mode.

14. A computerized coding method, comprising:
    defining one or more white space rules for definitions of one or more software programming XML literals, wherein white space is included as part of the definition of any XML literals used in the XML source program; and
    employing the white space rules to define virtual margins within an XML source program,
    wherein the virtual margin begins when a software programming XML literal is defined within the XML source program and wherein spaces to the left of the virtual margin are not considered part of the definition of the XML literal, the spaces to the left of the virtual margin being allowed to exist in the XML source program to show the boundary point for the definition of the XML literal,
    the spaces to the right of the virtual margin being considered part of the definition of the XML literal, the XML literals including at least a portion of embedded code existing to the left of the virtual margin, such that the virtual left margin is temporarily interrupted and restored at the end of the embedded code, wherein one or more special codes indicating a break in the XML literal's definition allow the embedded code to exist to the left of the virtual margin.

15. The method of claim 14, further comprising automatically enforcing the white space rules during input of the literal definitions or during compilation of the literal definitions.

16. The method of claim 14, further comprising nesting a plurality of virtual margins.

17. The method of claim 14, further comprising embedding code to the left of the virtual margins.

18. A computerized coding system, comprising:
    a processor;
    an inputting module for inputting one or more definitions of software programming XML literals in an XML source code program, wherein white space is included as part of the definition of any XML literals used in the XML source program;
    a defining module for defining virtual margins in the XML source code program;
    an enforcing module for enforcing the virtual margins in the XML source code program; and
    a compiling module for compiling the virtual margins and the XML source code program,
    wherein the virtual margin begins when a software programming XML literal is defined within the source program and wherein spaces to the left of the virtual margin are not considered part of the definition of the XML literal, the spaces to the left of the virtual margin being allowed to exist in the XML source program to show the boundary point for the definition of the XML literal, the spaces to the right of the virtual margin being considered part of the definition of the XML literal, the XML literals including at least a portion of embedded code existing to the left of the virtual margin, such that the virtual left margin is temporarily interrupted and restored at the end of the embedded code, wherein one or more special codes indicating a break in the XML literal's definition allow the embedded code to exist to the left of the virtual margin.

* * * * *